(12) United States Patent
Tu et al.

(10) Patent No.: US 12,261,980 B2
(45) Date of Patent: Mar. 25, 2025

(54) MARKING METHOD ON IMAGE COMBINED WITH SOUND SIGNAL, TERMINAL APPARATUS, AND SERVER

(71) Applicant: Acer Incorporated, New Taipei (TW)

(72) Inventors: Po-Jen Tu, New Taipei (TW);
Ming-Chun Fang, New Taipei (TW);
Jia-Ren Chang, New Taipei (TW);
Kai-Meng Tzeng, New Taipei (TW);
Chao-Kuang Yang, New Taipei (TW)

(73) Assignee: Acer Incorporated, New Taipei (TW)

( * ) Notice: Subject to any disclaimer, the term of this patent is extended or adjusted under 35 U.S.C. 154(b) by 302 days.

(21) Appl. No.: 17/990,746

(22) Filed: Nov. 21, 2022

(65) Prior Publication Data
US 2024/0098183 A1    Mar. 21, 2024

(30) Foreign Application Priority Data
Sep. 16, 2022   (TW) .................................. 111135241

(51) Int. Cl.
*H04M 3/56*   (2006.01)
*H04N 7/15*   (2006.01)
(52) U.S. Cl.
CPC .......... *H04M 3/563* (2013.01); *H04M 3/567* (2013.01); *H04N 7/15* (2013.01)

(58) Field of Classification Search
CPC ......... H04M 3/563; H04M 3/567; H04N 7/15
USPC ............ 379/202.01, 201.01, 201.05, 201.02, 379/201.03
See application file for complete search history.

(56) References Cited

U.S. PATENT DOCUMENTS

2012/0163610 A1*  6/2012  Sakagami ................. H04S 7/30
                                                        381/56
2019/0251661 A1*  8/2019  Aoyama ............... H04N 5/2628

FOREIGN PATENT DOCUMENTS

| TW | 200426647 | 12/2004 |
| TW | 201539296 | 10/2015 |
| TW | 202046707 | 12/2020 |
| TW | 202134856 | 9/2021 |

* cited by examiner

*Primary Examiner* — Thjuan K Addy
(74) *Attorney, Agent, or Firm* — JCIPRNET (57) ABSTRACT

A marking method on image combined with sound signal, a terminal apparatus, and a server are provided. In the method, a first image is displayed. A selection command is detected. A target sound signal is embedded into a speech signal so as to generate a combined sound signal. The combined sound signal is transmitted. The selection command corresponds to a target region in the first image, and the selection command is generated selecting the target region through an input operation. The target sound signal corresponds to the target region of the selection command, and the speech signal is obtained by receiving sound. Accordingly, all attendants in the video conference are able to make makings on a shared screen.

20 Claims, 7 Drawing Sheets

MARKING METHOD ON IMAGE COMBINED WITH SOUND SIGNAL, TERMINAL APPARATUS, AND SERVER

CROSS-REFERENCE TO RELATED APPLICATION

This application claims the priority benefit of Taiwan application serial no. 111135241, filed on Sep. 16, 2022. The entirety of the above-mentioned patent application is hereby incorporated by reference herein and made a part of this specification.

BACKGROUND

Technical Field

The disclosure relates to a signal processing technology, and more particularly, to a marking method on image combined with sound signal, a terminal apparatus, and a server.

Related Art

Remote conferencing allows multiple people in different locations or spaces to talk to each other, and conference-related apparatuses, protocols, and applications are well developed. Notably, during a video conference, a presenter's computer may share/project the screen for other attendants to view the desktop, documents or specific applications. However, according to the settings provided by the current video conferencing software on the market, people can see the content of the presenter's projection, but there is no way for other users to add special markings to the projected content of the presenter. When other users tries to explain a specific part of the projected content, they need to take hard effort to explain which specific part they are referring to.

SUMMARY

The embodiments of the disclosure provide a marking method on an image combined with a sound signal, a terminal apparatus, and a server, which is capable of carrying an indication of a marking for image through a sound signal, thereby improving convenience. A marking method on image combined with sound signal according to the embodiments of the disclosure includes (but is not limited to) the following steps. A first image is displayed. A selection command is detected. A target sound signal is embedded into a speech signal so as to generate a combined sound signal. The combined sound signal is transmitted. The selection command corresponds to a target region in the first image, and the selection command is generated by selecting the target region through an input operation. The target sound signal corresponds to the target region of the selection command, and the speech signal is obtained by receiving sound.

A terminal apparatus according to the embodiments of the disclosure includes (but is not limited to) a display, a communication transceiver, an input apparatus, a storage, and a processor. The storage is configured to store a code. The processor is coupled to the display, the communication transceiver, the input apparatus, and the storage. The processor is configured to load the code to perform the following. A first image is displayed. A selection command is detected. A target sound signal is embedded into a speech signal so as to generate a combined sound signal. The combined sound signal is transmitted. The selection command corresponds to a target region in the first image, and the selection command is generated by selecting the target region through an input operation. The target sound signal corresponds to the target region of the selection command, and the speech signal is obtained by receiving sound.

A server according to the embodiments of the disclosure includes (but is not limited to) a communication transceiver, a storage, and a processor. The storage is configured to store a code. The processor is coupled to the communication transceiver and the storage. The processor is configured to load the code to perform the following. A combined sound signal is received. The combined sound signal is distinguished into a speech signal and a target sound signal. A target region corresponding to the target sound signal is determined. A marking is generated at the target region in a second image so as to generate a first image signal. The first image signal is transmitted. The speech signal is obtained by receiving sound. The first image signal includes the second image having the marking.

Based on the above, according to the marking method on image combined with sound signal, terminal apparatus, and server according to the embodiments of the disclosure, the terminal apparatus may embed a target sound signal corresponding to a target region in an image into a speech signal, and the server may add a marking to the target region in the image according to the target sound signal. In this way, under the setting conforming to the video software, the indication of an image marking may be carried by a sound signal, thereby enhancing the convenience and further improving the experience of the video conference.

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Reference will now be made in detail to the exemplary embodiments of the disclosure, examples of which are illustrated in the accompanying drawings. Wherever possible, the same reference numbers are used in the drawings and the description to refer to the same or like parts.

Figure 1:
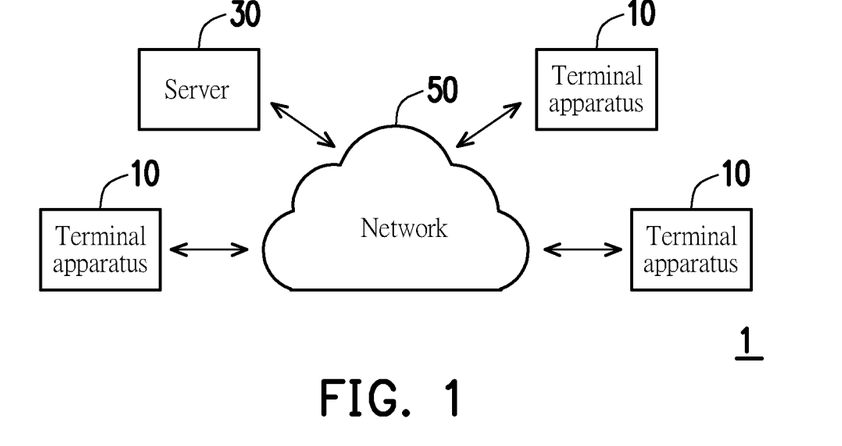
FIG. 1 is a block diagram of components of a system according to an embodiment of the disclosure.

FIG. 1 is a block diagram of components of a system 1 according to an embodiment of the disclosure. Referring to FIG. 1, the system 1 includes (but is not limited to) one or more terminal apparatus 10 and a server 30.

The terminal apparatus 10 may be a mobile phone, an internet phone, a tablet computer, a desktop computer, a notebook computer, a smart assistant or an in-vehicle system.

Figure 2:
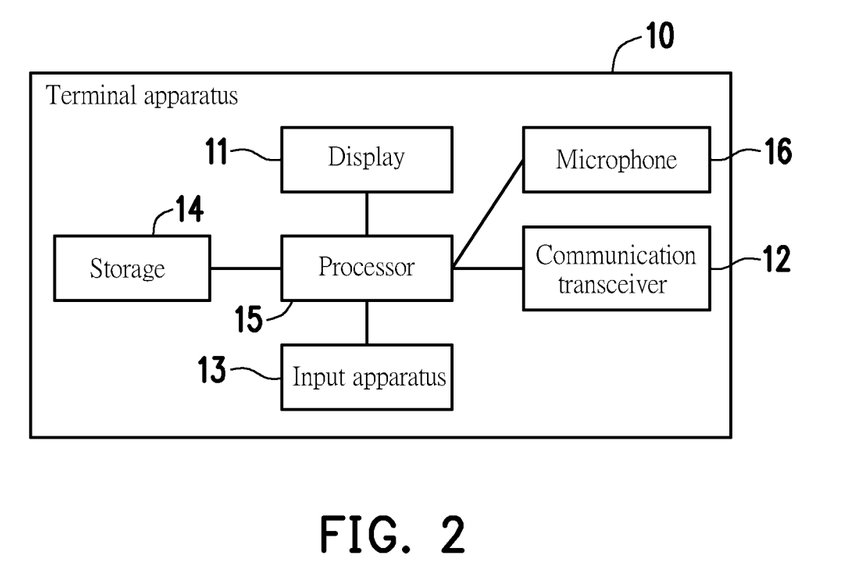
FIG. 2 is a block diagram of components of a terminal apparatus according to an embodiment of the disclosure.

FIG. 2 is a block diagram of components of the terminal apparatus 10 according to an embodiment of the disclosure. Referring to FIG. 2, the terminal apparatus 10 includes (but is not limited to) a display 11, a communication transceiver 12, an input apparatus 13, a storage 14, and a processor 15.

The display 11 may be a liquid crystal display (LCD), a (Light-Emitting Diode, LED) display, an organic light-emitting diode (OLED), a quantum dot display, or other type of display. In one embodiment, the display 11 is configured to display images, such as images of a user interfaces, document, picture, or video.

The communication transceiver 12 may be one that supports mobile communications such as fourth generation (4G), fifth generation (5G) or other generations, Wi-Fi, bluetooth, infrared, Radio frequency identification (RFID), Ethernet, optical network, and others, and serial communication interfaces (such as RS-232), or may be Universal Serial Bus (USB), Thunderbolt or other communication transmission interfaces. In the embodiment of the disclosure, the communication transceiver 12 is configured to transmit or receive data with other electronic apparatuses (e.g. the server 30 or other terminal apparatus 10) via a network 50 (e.g. wired network, wireless network or private network).

The input apparatus 13 may be a mouse, a keyboard, a touch panel, a trackball, a button, or a switch. In one embodiment, the input apparatus 13 is configured to receive input operations (e.g. operations of sliding, pressing, touching, or pulling), and generates corresponding commands accordingly. It should be noted that input operations on a plurality of components of the input apparatus 13 may generate different commands. For example, pressing a left mouse button may generate a selection command. For another example, clicking twice on a right mouse button may generate a cancellation command. The contents and functions of the commands will be described in subsequent embodiments.

The storage 14 may be any type of fixed or removable random access memory (RAM), read only memory (ROM), flash memory, conventional Hard Disk Drives (HDD), Solid-State Drive (SSD) or similar components. In one embodiment, the storage 14 is configured to store code, software modules, configuration, data (e.g. images, commands, sound signals, etc.) or files, and the embodiments thereof will be described in detail later.

The processor 15 is coupled to the display 11, the communication transceiver 12, the input apparatus 13 and the storage 14. The processor 15 may be a central processing unit (CPU), a graphics processing unit (GPU), or other programmable general-purpose or special-purpose Microprocessors, Digital Signal Processors (DSP), programmable controllers, Field Programmable Gate Arrays (FPGA), Application-Specific Integrated Circuits (ASIC), neural network accelerator, or other similar components or combinations of the above components. In one embodiment, the processor 15 is configured to execute all or part of the operations of the terminal apparatus 10, and may load and execute each code, software module, file and data stored in the storage 14. In some embodiments, the functions of the processor 15 may be implemented through software or a chip.

In one embodiment, the terminal apparatus 10 further includes a microphone 16. The microphone 16 may be a dynamic, condenser, or electret condenser type microphone. The microphone 16 may also be a combination of electronic components, analog-to-digital converters, filters, and audio processors that may receive sound waves (e.g. human voices, ambient sounds, machine sounds, etc.) and convert them into sound signals. In one embodiment, the microphone 16 is configured to receive/record voice of a speaker so as to obtain a speech signal. In some embodiments, the speech signal may include the speaker's voice, the sound from a loudspeaker, and/or other ambient sounds.

Figure 3:
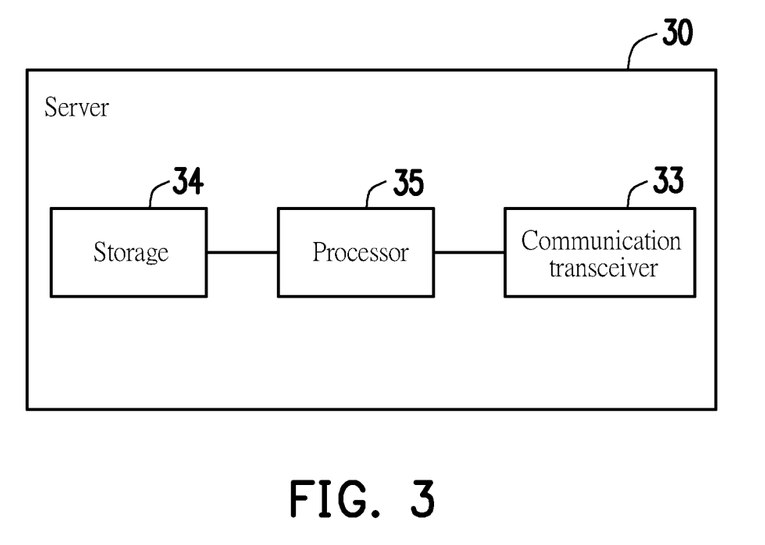
FIG. 3 is a block diagram of components of a server according to an embodiment of the disclosure.

FIG. 3 is a block diagram of components of the server 30 according to an embodiment of the disclosure. Referring to FIG. 3, the server 30 includes (but is not limited to) a communication transceiver 33, a storage 34 and a processor 35.

The implementation aspects and functions of the communication transceiver 33, the storage 34 and the processor 35 may be referred to the descriptions of the communication transceiver 12, the storage 14, and the processor 15 respectively, which will not be repeated here. In one embodiment, the processor 35 is configured to execute all or part of the operations of the server 30, and may load and execute various code, software modules, files, and data stored in the storage 34.

Hereinafter, the method according to the embodiment of the disclosure will be described in conjunction with various apparatuses, components, and modules in the system 1. Each process of the method may be adjusted according to the implementation situation, and is not limited thereto.

Figure 4:
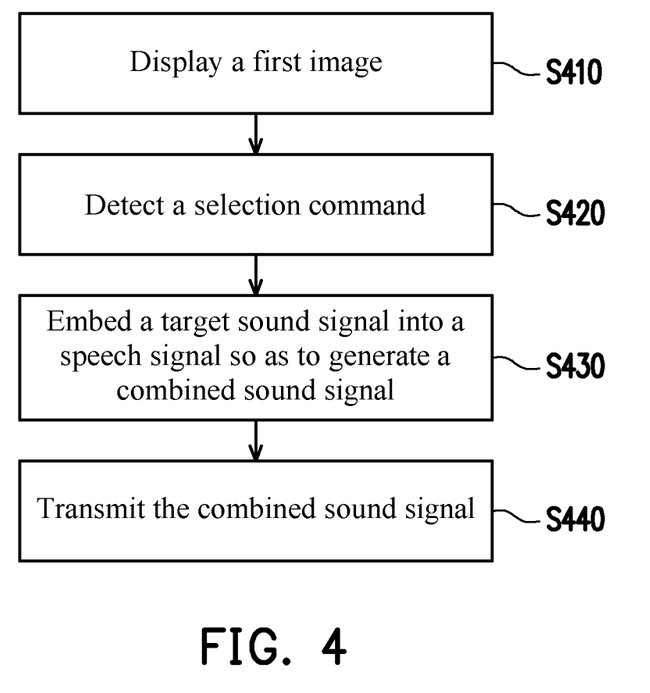
FIG. 4 is a flowchart of a marking method on an image combined with a sound signal for a terminal apparatus according to an embodiment of the disclosure.
Figure 5:
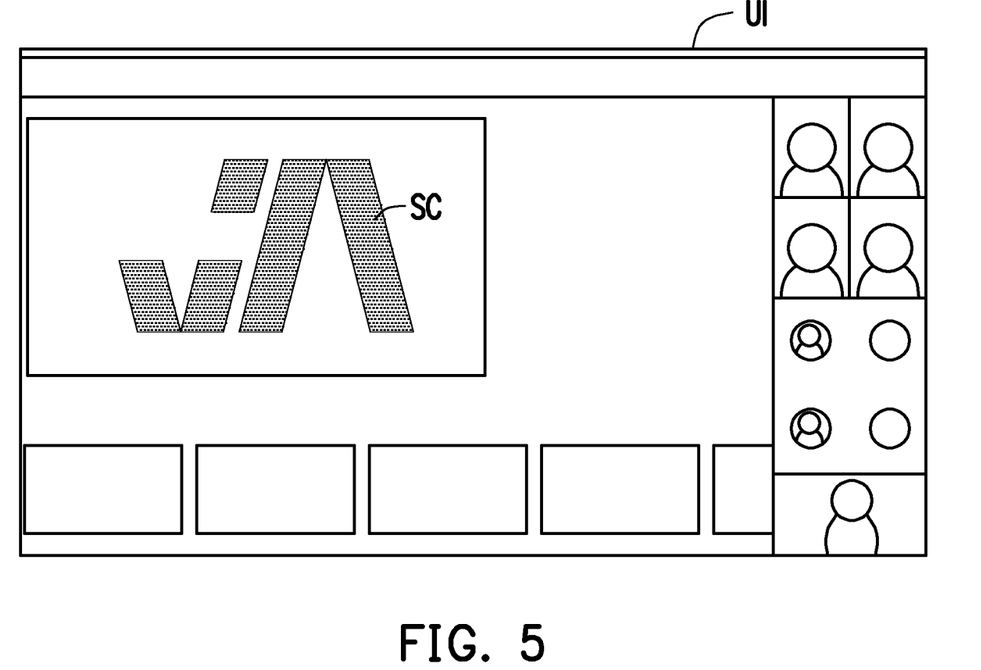
FIG. 5 is a schematic diagram of a user interface of a video software according to an embodiment of the disclosure.

FIG. 4 is a flowchart of a marking method on an image combined with a sound signal for the terminal apparatus 10 according to an embodiment of the disclosure. Referring to FIG. 4, the processor 15 displays a first image through the display 11 (step S410). In one embodiment, the first image may be a user interface of video software (e.g. Zoom, Webex, Teams, or Meet). For example, FIG. 5 is a schematic diagram of a user interface UI of a video software according to an embodiment of the disclosure. Referring to FIG. 5, the user interface UI may present icons or real-time images of the attendants and a shared screen SC according to different design requirements. The content of the shared screen SC is, for example, a slideshow, a document, a video, or a picture. In another embodiment, the first image may also be a screen of a user interface of other types of software, a streaming image, a film, a picture, or a picture of a document.

The processor 15 detects the selection command (step S420). To be specific, the selection command corresponds to a target region in the first image, and the selection command is generated by selecting the target region through an input operation received by the input apparatus 13. In other words, the first image includes one or more regions, and the input operation is for selecting the target region in these regions of the first image.

Figure 6:
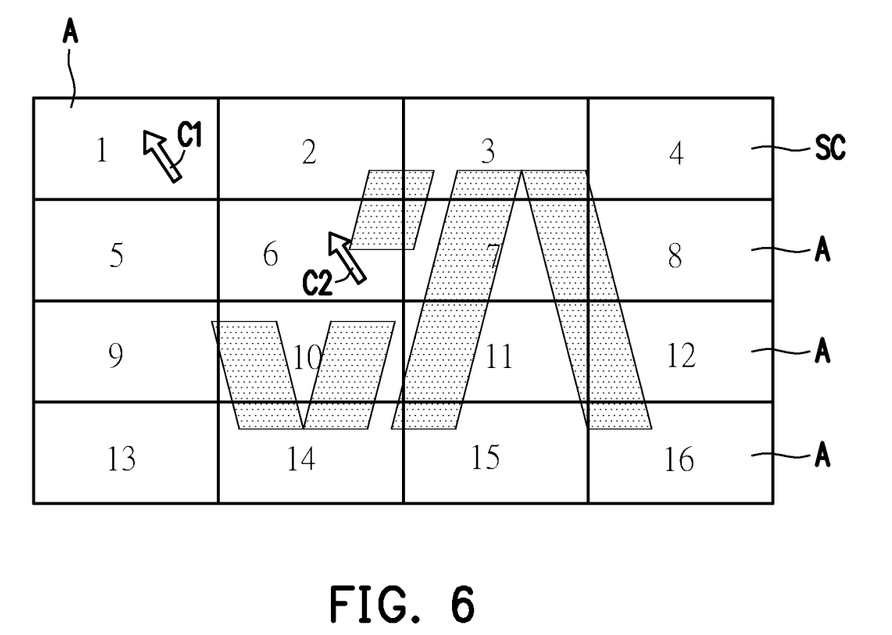
FIG. 6 is a schematic diagram of region division according to an embodiment of the disclosure.

For example, FIG. 6 is a schematic diagram of region division according to an embodiment of the disclosure. Referring to FIG. 6, the shared screen SC in the user interface UI of FIG. 5 is divided into a plurality of regions A. Adjacent regions A may not overlap or may partially overlap. "1", "2" ... "16" on the region A represent the identification code of the region. It is assume that a cursor C1 of another user (as the secondary terminal apparatus 10, for example) is located in the region A with the identification code "1", and a cursor C2 of a presenter (as the primary terminal apparatus 10, for example) is located in the region A with the identification code "6". The regions A include the target region. When the secondary terminal apparatus 10 receives an input operation of two mouse clicks, the region A with the identification code "1" is the target region. It should be noted that the division method of the region and the naming method of the identification code shown in FIG. 6 are only examples, and the user may change the division method and the identification code according to actual needs. For example, the identification code may be the coordinates of a two-dimensional coordinate system.

Figure 7:
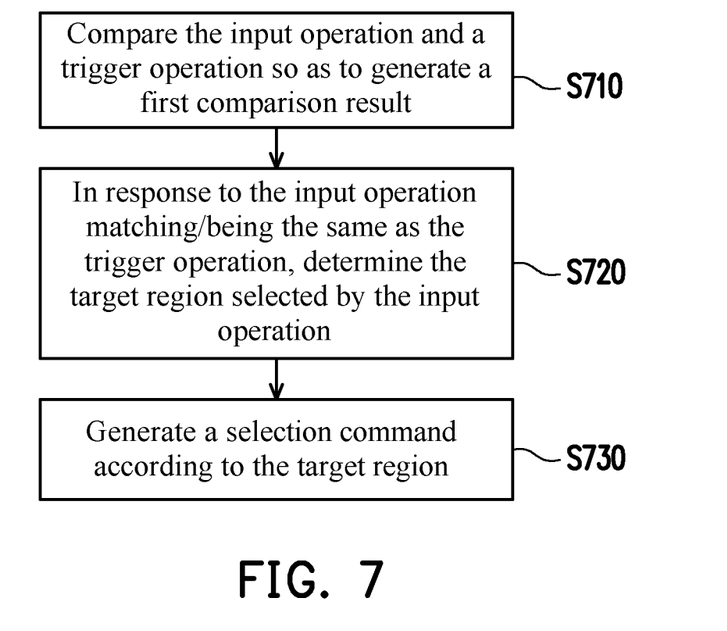
FIG. 7 is a flowchart of generating a command for trigger operation according to an embodiment of the disclosure.

FIG. 7 is a flowchart of generating a command for trigger operation according to an embodiment of the disclosure. Referring to FIG. 7, the processor 15 may compare the input operation and a trigger operation so as to generate a first comparison result (step S710). The trigger operation may be one or more preset operations, such as one click on the left mouse button, a touch on a certain region in the first image or a specific button. For another example, 16 keys of the keyboard correspond to the 16 regions in FIG. 6 respectively, and the trigger operation may be that any one of the 16 keys is pressed. However, the definition of the trigger operation may have many variations, and the user may make modifications according to actual needs, which is not limited in the embodiment of the disclosure. The processor 15 determines whether the input operation is a preset trigger operation. Therefore, the first comparison result includes that the input operation matches/is the same as the trigger operation, and the input operation does not match/is different from the trigger operation.

In response to the input operation matching/being the same as the trigger operation, the processor 15 may determine the target region selected by the input operation (step S720). For example, the processor 15 determines the region where the cursor is located or the region to which a specific component (e.g. a key, a button, or a sensing component) of the input apparatus 13 corresponds. Taking FIG. 6 as an example, the cursor C1 of another user is located in the region A with the identification code "1", so this region A is the target region.

The processor 15 may generate a selection command according to the target region (step S730). Since the position of the target region in the first image is confirmed, the selection command is a command for selecting the target region, and the selection command is detected accordingly. In response to the input operation not matching/being different from the trigger operation, the target region is disabled/stopped/not determined and/or a selection command is generated.

Referring to FIG. 4, the processor 15 embeds a target sound signal into a speech signal so as to generate a combined sound signal (step S430). Specifically, the target sound signal corresponds to the target region of the selection command, and the speech signal is obtained by receiving sound.

Figure 8:
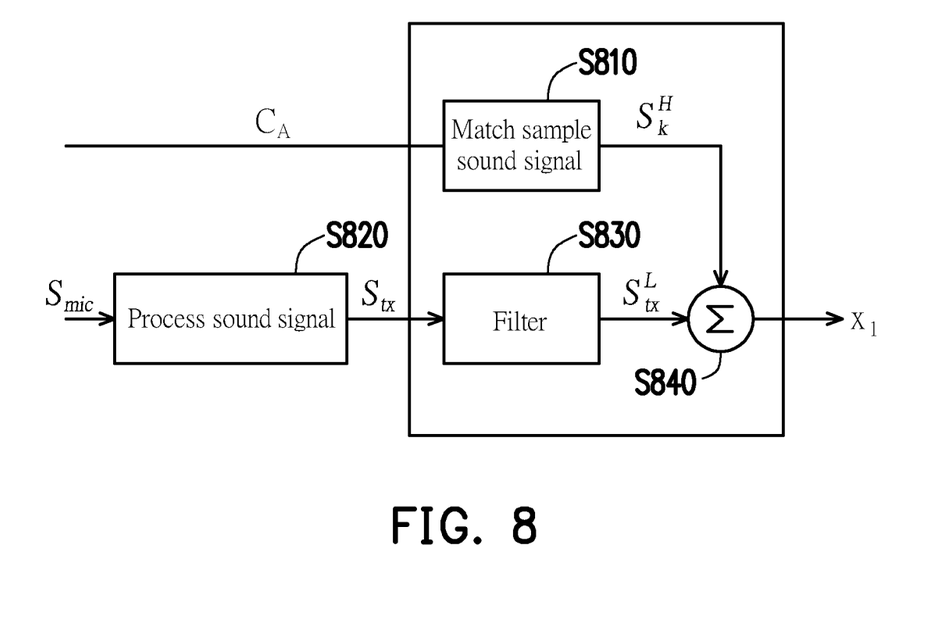
FIG. 8 is a flowchart of matching, filtering and embedding according to an embodiment of the disclosure.

FIG. 8 is a flowchart of matching, filtering, and embedding according to an embodiment of the disclosure. Referring to FIG. 8, the processor 15 may determine a target sound signal $S_k^H$ matching the identification code of the target region from one or more sample sound signals according to a selection command CA (step S810). The one or more regions correspond to one or more identification codes, respectively. For example, the 16 regions A shown in FIG. 6 correspond to the identification codes "1" to "16", respectively. One or more identification codes also correspond to one or more sample sound signals, respectively. The sample sound signal may be any custom sound signal, such as a sound signal of a specific frequency band, code, amplitude, waveform or melody. Different identification codes correspond to different sample sound signals. In other words, there is a one-to-one correspondence between the regions and sample sound signals. However, in other embodiments, there may also be a many-to-one or one-to-many correspondence between the regions and the sample sound signals. Taking FIG. 6 as an example, the processor 15 may select the sample sound signal with the identification code "1" as the target sound signal. In some embodiments, the processor 15 may find the target sound signal matching the target region directly according to the correspondence between the region and the sample sound signal.

On the other hand, the processor 15 may receive sound through the microphone 16 or receive an original sound signal $S_{mic}$ from other recording apparatuses. In other words, the original sound signal $S_{mic}$ is a sound signal generated by receiving/recording a sound source (e.g. a user, an animal, or the environment). The processor 15 may perform echo cancellation, noise suppression, power gain and/or sound signal processing on the original sound signal $S_{mic}$ (step S820, optional) to generate an original sound signal $S_{rx}$. The processor 15 may pass the original sound signal $S_{rx}$ through a filter (step S830) to generate a speech signal $S_{rx}^L$. The filter is configured to filter out the sound signals other than the first frequency band, and the speech signal $S_{rx}^L$ belongs to the first frequency band. For example, the first frequency band is a frequency of 5 kHz or lower or a frequency between 2 k to 5 k. The target sound signal $S_k^H$ belongs to a second frequency band higher than the first frequency band. For example, the second frequency band is a frequency between 5 kHz-8 kHz or a frequency of 6 kHz or higher.

Next, the processor 15 may embed the target sound signal $S_k^H$ into the speech signal $S_{rx}^L$ (step S840). For example, the processor 15 may directly superimpose the target sound signal $S_k^H$ and the speech signal $S_{rx}^L$ on the time domain or the frequency domain, so as to output a combined sound signal x1.

Referring to FIG. 4, the processor 15 transmits the combined sound signal via the network 50 through the communication transceiver 12 (step S440). To be specific, compared with the prior art in which speech signals are directly transmitted, the target sound signal in the combined sound signal according to the embodiment of the disclosure may correspond to the target region in the first image, thereby indicating that the target region is selected or needs attention/emphasis/markings. Moreover, in the case where the selection command is not detected, the terminal apparatus 10 may directly transmit only the speech signal.

An operation of image marking may be processed by the server 30 and will be described in detail in subsequent embodiments. Then, the processor 15 may receive the image signal from the server 30 or other apparatuses. The processor 15 may display a second image in the image signal through the display 11. The second image is a shared screen (e.g. screen of a video image, a streaming image, a video, a picture, or a document). The target region in the second image has the marking. The marking may be of any pattern, shape, color, symbol, transparency and/or texture, such as stars, hearts, or squares. The detailed description of the image signal will also be explained in the subsequent embodiments.

Figure 9:
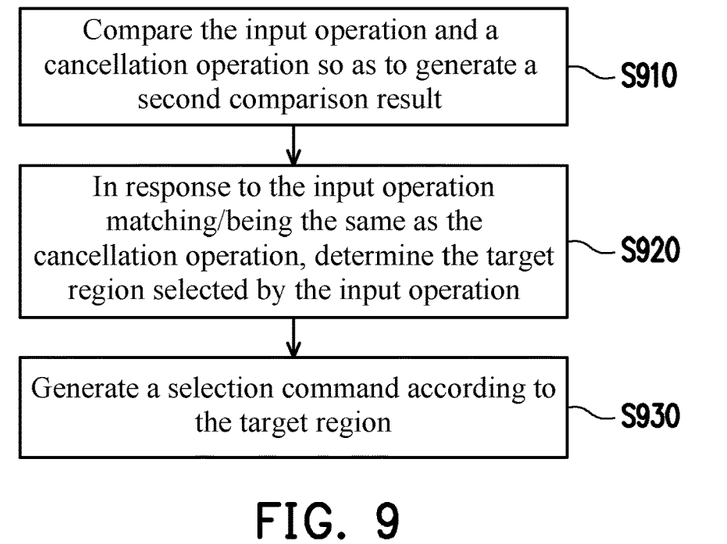
FIG. 9 is a flowchart of generating a command for cancellation operation according to an embodiment of the disclosure.

In addition to indicating the target region to be selected or that needs attention/emphasis/marking, the selection/attention/emphasize/marking may further be cancelled. FIG. 9 is a flowchart of generating a command for cancellation operation according to an embodiment of the disclosure. Referring to FIG. 9, the processor 15 may compare the input operation and a cancellation operation so as to generate a second comparison result (step S910). Similarly, the cancellation operation may be one or more preset operations, such as one click on the right mouse click, a touch on the target region in the marked second image or a specific button. For another example, the 16 keys of the keyboard correspond to the 16 regions in FIG. 6 respectively, and the cancellation operation may be that any one of the 16 keys is pressed twice. However, the definition of the cancellation operation may have many variations, and the user may make modifications according to actual needs, which is not limited in the embodiment of the disclosure. The processor 15 determines whether the input operation is a preset cancellation operation. Therefore, the second comparison result includes that the input operation matches/is the same as the trigger operation, and the input operation does not match/is different from the trigger operation.

In response to the input operation matching/being the same as the cancellation operation, the processor 15 may determine the target region selected by the input operation (step S920). For example, the processor 15 determines the region where the cursor is located, and the region to which a specific component (e.g. a key, a button, or a sensing component) of the input apparatus 13 corresponds. Taking FIG. 6 as an example, the cursor C 1 of another user is located in the region A with the identification code "1", so this region A is the target region.

The processor 15 may generate a selection command according to the target region (step S930). Since the position of the target region in the second image is confirmed, the selection command is a command for selecting the target region, and the selection command is detected accordingly. Moreover, different from the embodiment of FIG. 7 relating to trigger operation, the selection command is further accompanied by a cancellation command, and the cancellation command is configured to cancel the marking of the target region in the second image (with marking). In response to the input operation not matching/being different from the cancellation operation, the target region is disabled/stopped/not determined and/or a selection command is generated.

It should be noted that the disclosure is not limited to the (secondary) terminal apparatus 10 of other users who do not share the screen for transmitting the combined sound signal with marking indication. The (primary) terminal apparatus 10 of the presenter sharing the screen may also transmit the combined sound signal with marking indication as required.

Figure 10:
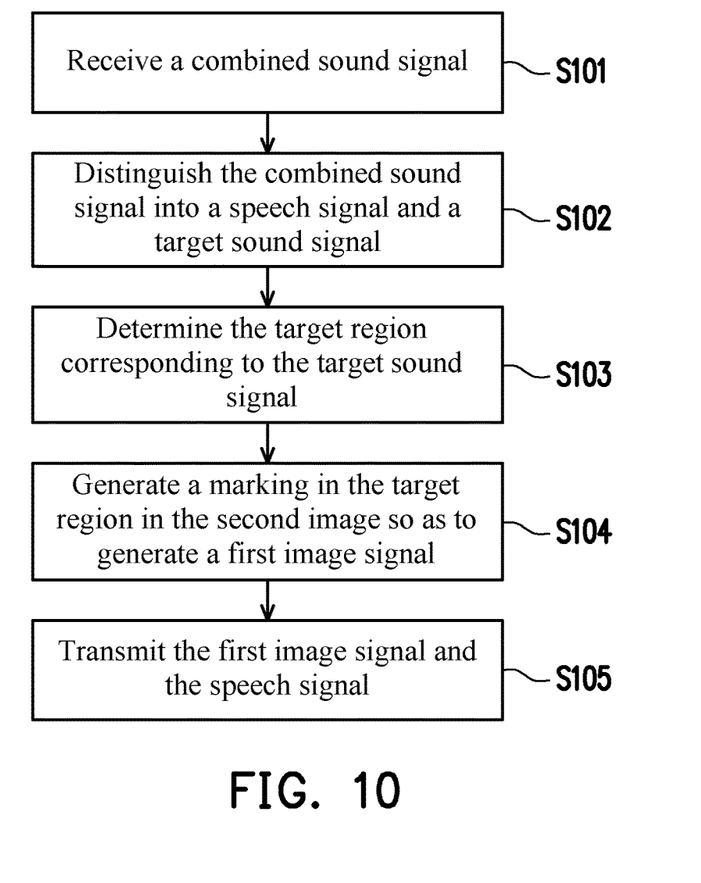
FIG. 10 is a flowchart of a marking method on an image combined with a sound signal for a server according to an embodiment of the disclosure.

FIG. 10 is a flowchart of a marking method on an image combined with a sound signal for the server 30 according to an embodiment of the disclosure. Referring to FIG. 10, the processor 35 receives the combined sound signal via the network 50 through the communication transceiver 33 (step S101). The combined sound signal is the sound signal transmitted by the terminal apparatus 10 via the network 50.

The processor 35 distinguishes the combined sound signal into a speech signal and a target sound signal (step S102). It may be known from the embodiment of FIG. 4 that the combined sound signal is generated by embedding the target sound signal into the speech signal. Therefore, the processor 35 separates the speech signal and the target sound signal from the combined sound signal for subsequent different processing.

Figure 11:
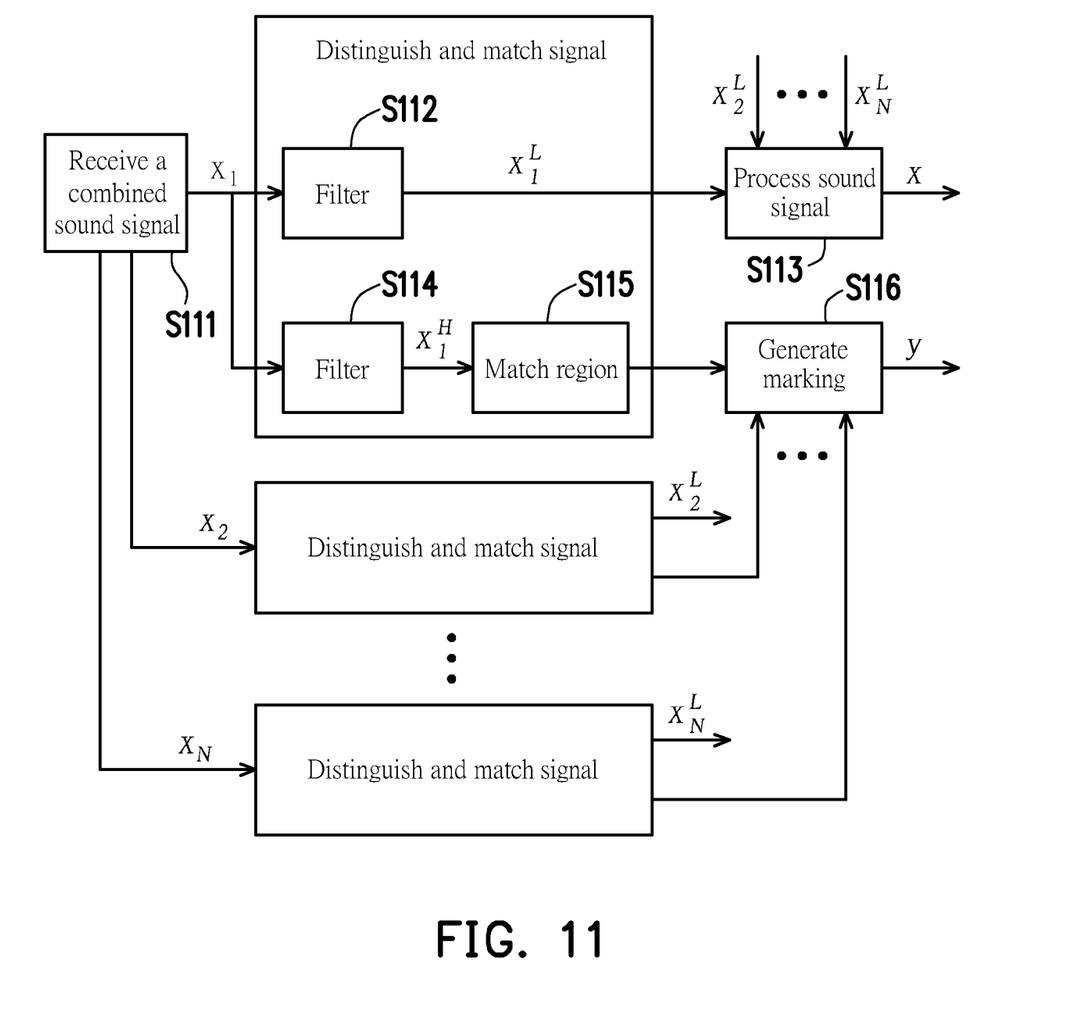
FIG. 11 is a flowchart of filtering, matching, and marking according to an embodiment of the disclosure.

FIG. 11 is a flowchart of filtering, matching, and marking according to an embodiment of the disclosure. Referring to FIG. 11, combined sound signals x1, x2 . . . xN (N is a positive integer) respectively represent the sound signals transmitted by different terminal apparatus 10 via the network 50. Taking the combined sound signal x1 as an example, the processor 35 may pass the combined sound signal x1 through a first filter (step S112) to generate a speech signal $x_1^L$ (e.g. the speech signal $S_{tx}^L$ in FIG. 8). Similarly, the first filter is configured to filter out the sound signals other than the first frequency band, and the speech signal belongs to the first frequency band. For example, the first frequency band is a frequency of 5 kHz or lower or a frequency between 2 k and 5 k. In one embodiment, the processor 35 may perform synthesis, superposition, echo cancellation, noise suppression and/or other sound signal processing on separated/distinguished speech signals $x_1^L$, $x_2^L$, . . . $x_N^L$ of the different combined sound signals x1, x2, . . . xN (step S113) to generate a synthesized speech signal x.

On the other hand, a target sound signal $x_1^H$ belongs to a second frequency band higher than the first frequency band. For example, the second frequency band is a frequency between 5 kHz and 8 kHz or a frequency of 6 kHz or higher. Taking the combined sound signal x1 as an example, the processor 35 may pass the combined sound signal x1 through a second filter (step S114) to generate the target sound signal $x_1^H$ (e.g. speech signal $S_{tx}^H$ in FIG. 8). The second filter is configured to filter out the sound signals other than the second frequency band, so the output of the second filter may retain the target sound signal $x_1^H$.

Referring to FIG. 10, the processor 35 determines the target region corresponding to the target sound signal (step S103). To be specific, as described in the embodiment of FIG. 4, each sample sound signal corresponds to one or more regions in the first image. Referring to FIG. 11, the processor 35 may determine a first sample sound signal of the one or more sample sound signals matching the target sound signal, and determine the target region according to the identification code of the first sample sound signal (step S115). For example, the processor 35 may determine the correlation between the target sound signal and any one of the sample sound signals using cross correlation or other techniques for comparing sound signals, and take the one with the highest correlation or similarity as the first sample sound signal. In other words, the first sample sound signal with the highest correlation/similarity matches the target sound signal.

Figure 12:
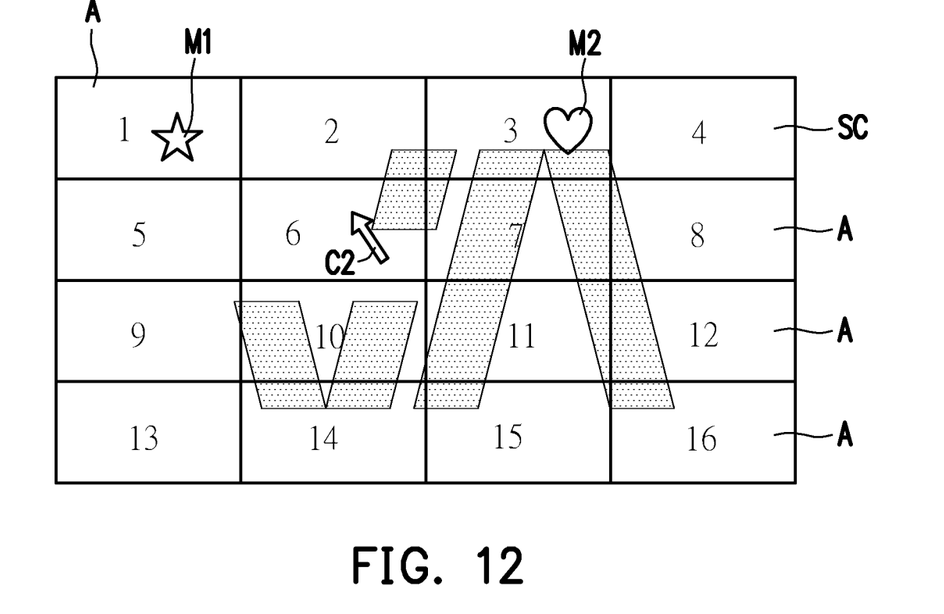
FIG. 12 is a schematic diagram of marking generation according to an embodiment of the disclosure.

Furthermore, the one or more regions correspond to one or more identification codes, respectively. For example, the 16 regions A shown in FIG. 6 correspond to the identification codes "1" to "16", respectively. The one or more identification codes also correspond to one or more sample sound signals, respectively. When the second image is the user interface of a video software (e.g. the user interface UI shown in FIG. 5), the shared screen in the user interface may also be divided into multiple regions (as shown in FIG. 6, in which the shared screen SC is divided in to 16 regions). The second image is the image in the image signal received by the terminal apparatus 10 described in the embodiments of the terminal apparatus 10. In other words, the second image is an image in the image signal to be generated and/or transmitted by the server 30 subsequently, and the second image is also a screen to be shared. If it is confirmed which of the one or more sample sound signals the target sound signal is, according to the correspondence between the sample sound signal and the region, the processor may also know which of the one or more regions the target region is. For example, FIG. 12 is a schematic diagram of marking generation according to an embodiment of the disclosure. Referring to FIG. 12, it is assumed that the target region is the region with the identification code "1".

Referring to FIG. 10, the processor 35 generates a marking in the target region in the second image so as to generate a first image signal (step S104). The second image is an image provided to the terminal apparatus 10 participating in the same video conference. The processor 35 may draw, add or affix a marking to the target region in the second image. The variations of the labels are described in the foregoing embodiment, and will not be repeated here. The first image signal is one second image or a set of a plurality of second images, such as the second image of consecutive frames.

Referring to FIG. 11, in addition to the target region obtained by the combined sound signal x1, the same or different target regions may also be obtained by the combined sound signals x2, . . . xN. The processor 35 may generate markings in the second image according to the target regions (step S116) to output a first image signal y. Taking FIG. 12 as an example, the identification codes "1" and "3" are both target regions. Assuming that the target regions are indicated by different terminal apparatus 10, the processor 35 adds a star-shaped marking M1 and a heart-shaped marking M2 respectively.

The processor 35 transmits the first image signal and the speech signal via the network 50 through the communication transceiver 33 (step S105). Similarly, when the terminal apparatus 10 receives the first image signal from the server 30, the processor 15 may display the second image in the first image signal through the display 11. At this point, one or more regions in the second image are marked. As shown in FIG. 12, two regions A are marked M1 and M2. Moreover, the speech signal may be synthesized into the synthesized speech signal x of the plurality of terminal apparatus 10, as shown in FIG. 11.

Figure 13:
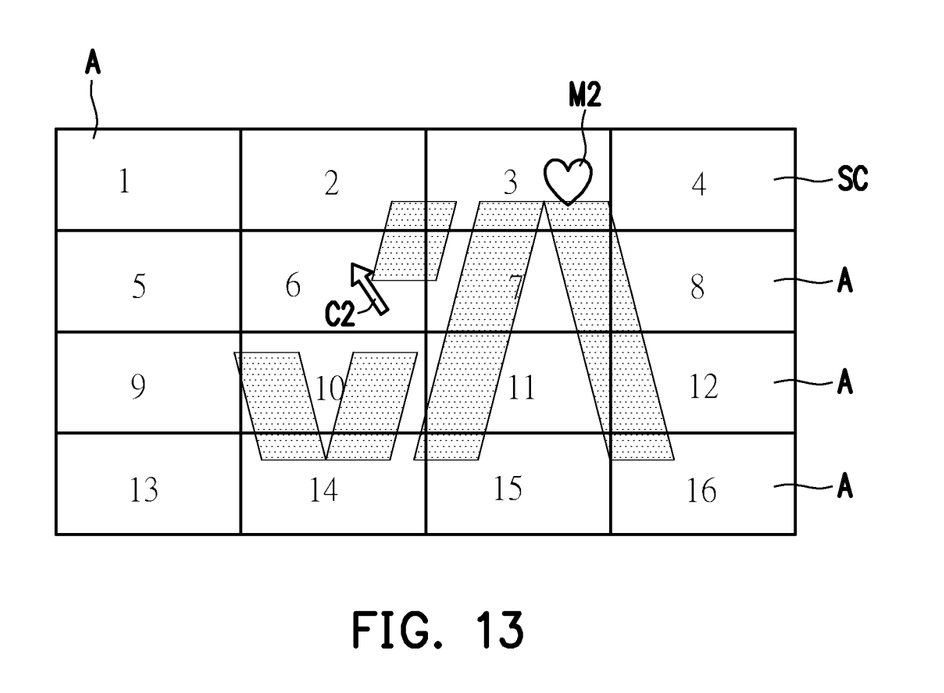
FIG. 13 is a schematic diagram of marking cancellation according to an embodiment of the disclosure.

In addition to indicating the target region that is selected or that needs attention/emphasis/marking, the selection/attention/emphasize/marking may further be cancelled. In one embodiment, the processor 35 may cancel the marking on the target region in the second image so as to generate a second image signal. In other words, different from the first image signal, the second image signal does not include a second image having the marking. The processor 35 may cancel the marking by removing the marking or pasting an original image of the region. Moreover, since the selection command generated by the terminal apparatus 10 is also accompanied by a cancellation command, the selection command also corresponds to a specific sample sound signal (as the target sound signal). The target sound signal not only indicates the target region, but also further indicates to cancel the marking on the target region. Then, the processor 35 may transmit the second image signal through the communication transceiver 33 to remove the marking of the specific terminal apparatus 10 from the second image. For example, FIG. 13 is a schematic diagram of marking cancellation according to an embodiment of the disclosure. Please refer to FIG. 12 and FIG. 13. Compared to FIG. 12, the marking M1 is removed such that FIG. 13 does not have the marking M1.

In summary, in the marking method on image combined with sound signal, terminal apparatus, and server according to the embodiments of the disclosure, the terminal apparatus may indicate through a combined sound signal that a target region in the image needs to be marked, and the server may generate the marking in the image according to the combined sound signal. In this way, all attendants of the video conference are able to make markings on the shared screen, thereby improving the convenience of the video conference, which in turn facilitates the experience of a multi-person conference.

It will be apparent to those skilled in the art that various modifications and variations may be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A marking method on image combined with sound signal, comprising:
    displaying a first image;
    detecting a selection command, wherein the selection command corresponds to a target region in the first image, and the selection command is generated by selecting the target region through an input operation;
    embedding a target sound signal into a speech signal so as to generate a combined sound signal, wherein the target sound signal corresponds to the target region of the selection command, and the speech signal is obtained by receiving sound; and
    transmitting the combined sound signal.

2. The marking method on image combined with sound signal according to claim 1, wherein embedding a sample sound signal into the speech signal comprises:
    passing an original sound signal through a filter so as to generate the speech signal, wherein the original sound signal is generated by receiving sound, the filter is configured to filter out sound signals other than a first frequency band, the speech signal belongs to the first frequency band, and the target sound signal belongs to a second frequency band higher than the first frequency band.

3. The marking method on image combined with sound signal according to claim 1, wherein the first image is a user interface of a video software, a shared screen in the user interface is divided into a plurality of regions, the regions comprise the target region, the regions respectively correspond to a plurality of identification codes, the identification codes respectively correspond to a plurality of sample sound signals, and embedding the target sound signal into the speech signal comprises:
    determining the target sound signal matching an identification code of the target region from the sample sound signals.

4. The marking method on image combined with sound signal according to claim 1, wherein detecting the selection command comprises:
    comparing the input operation with a trigger operation so as to generate a first comparison result;

in response to the first comparison result being that the input operation matches the trigger operation, determining the target region selected by the input operation; and generating the selection command according to the target region.

5. The marking method on image combined with sound signal according to claim 1, further comprising:

receiving an image signal; and displaying a second image in the image signal, wherein the target region in the second image has a marking.

6. The marking method on image combined with sound signal according to claim 5, wherein detecting the selection command comprises:

comparing the input operation with a cancellation operation so as to generate a second comparison result;

in response to the second comparison result being that the input operation matches the cancellation operation, determining the target region selected by the input operation; and generating the selection command according to the target region, wherein the selection command is accompanied by a cancellation command, and the cancellation command is configured to cancel the marking of the target region in the second image.

7. The marking method on image combined with sound signal according to claim 1, further comprising:

receiving the combined sound signal;

distinguishing the combined sound signal into the speech signal and the target sound signal, wherein the speech signal is obtained by receiving sound;

determining the target region corresponding to the target sound signal;

generating a marking at the target region in a second image so as to generate a first image signal, wherein the first image signal comprises the second image having the marking; and transmitting the first image signal and the speech signal.

8. The marking method on image combined with sound signal according to claim 7, wherein distinguishing the combined sound signal into the speech signal and the target sound signal comprises:

passing the combined sound signal through a first filter so as to generate the speech signal, wherein the first filter is configured to filter out sound signals other than a first frequency band, and the speech signal belongs to the first frequency band; and passing the combined sound signal through a second filter so as to generate the target sound signal, wherein the second filter is configured to filter out sound signals other than a second frequency band, the target sound signal belongs to the second frequency band, and the second frequency band is higher than the first frequency band.

9. The marking method on image combined with sound signal according to claim 7, wherein the second image is a user interface of a video software, a shared screen in the user interface is divided into a plurality of regions, the regions comprise the target region, the regions respectively correspond to a plurality of identification codes, the identification codes respectively correspond to a plurality of sample sound signals, and determining the target region corresponding to the target sound signal comprises:

determining a first sample sound signal matching the target sound signal from the sample sound signals; and determining the target region according to an identification code of the first sample sound signal.

10. The marking method on image combined with sound signal according to claim 7, further comprising:

cancelling the marking at the target region in the second image so as to generate a second image signal, wherein the second image signal does not comprise the second image having the marking; and transmitting the second image signal.

11. A terminal apparatus, comprising:

a display;

a communication transceiver;

an input apparatus;

a storage, configured to store a code; and a processor, coupled to the display, the communication transceiver, the input apparatus, and the storage and configured to load the code to:

display a first image through the display;

detect a selection command, wherein the selection command corresponds to a target region in the first image, and the selection command is generated by selecting the target region through an input operation received by the input apparatus;

embed a target sound signal into a speech signal so as to generate a combined sound signal, wherein the target sound signal corresponds to the target region of the selection command, and the speech signal is obtained by receiving sound; and transmit the combined sound signal through the communication transceiver.

12. The terminal apparatus according to claim 11, wherein the processor is further configured to:

pass an original sound signal through a filter so as to generate the speech signal, wherein the original sound signal is generated by receiving sound, the filter is configured to filter out sound signals other than a first frequency band, the speech signal belongs to the first frequency band, and the target sound signal belongs to a second frequency band higher than the first frequency band.

13. The terminal apparatus according to claim 11, wherein the first image is a user interface of a video software, a shared screen in the user interface is divided into a plurality of regions, the regions comprise the target region, the regions respectively correspond to a plurality of identification codes, the identification codes respectively correspond to a plurality of sample sound signals, and the processor is further configured to:

determine the target sound signal matching an identification code of the target region from the sample sound signals.

14. The terminal apparatus according to claim 11, wherein the processor is further configured to:

compare the input operation with a trigger operation so as to generate a first comparison result;

in response to the first comparison result being that the input operation matches the trigger operation, determine the target region selected by the input operation; and generate the selection command according to the target region.

15. The terminal apparatus according to claim 11, wherein the processor is further configured to:

receive an image signal through the communication transceiver; and display a second image in the image signal through the display, wherein the target region in the second image has a marking.

16. The terminal apparatus according to claim 15, wherein the processor is further configured to:
compare the input operation with a cancellation operation so as to generate a second comparison result;
in response to the second comparison result being that the input operation matches the cancellation operation, determine the target region selected by the input operation; and
generate the selection command according to the target region, wherein the selection command is accompanied by a cancellation command, and the cancellation command is configured to cancel the marking of the target region in the second image.

17. A server, comprising:
a communication transceiver;
a storage, configured to store a code; and
a processor, coupled to the communication transceiver and the storage and configured to load the code to:
receive a combined sound signal through the communication transceiver;
distinguish the combined sound signal into a speech signal and a target sound signal, wherein the speech signal is obtained by receiving sound;
determine a target region corresponding to the target sound signal;
generate a marking at the target region in a second image so as to generate a first image signal, wherein the first image signal comprises the second image having the marking; and
transmit the first image signal and the speech signal through the communication transceiver.

18. The server according to claim 17, wherein the processor is further configured to:
pass the combined sound signal through a first filter so as to generate the speech signal, wherein the first filter is configured to filter out sound signals other than a first frequency band, and the speech signal belongs to the first frequency band; and
pass the combined sound signal through a second filter so as to generate the target sound signal, wherein the second filter is configured to filter out sound signals other than a second frequency band, the target sound signal belongs to the second frequency band, and the second frequency band is higher than the first frequency band.

19. A server according to claim 17, wherein the second image is a user interface of a video software, a shared screen in the user interface is divided into a plurality of regions, the regions comprise the target region, the regions respectively correspond to a plurality of identification codes, the identification codes respectively correspond to a plurality of sample sound signals, and the processor is further configured to:
determine a first sample sound signal matching the target sound signal from the sample sound signals; and
determine the target region according to an identification code of the first sample sound signal.

20. The server according to claim 17, wherein the processor is further configured to:
cancel the marking at the target region in the second image so as to generate a second image signal, wherein the second image signal does not comprise the second image having the marking; and
transmit the second image signal through the communication transceiver.

* * * * *